(12) United States Patent
Gutierrez

(10) Patent No.: US 7,560,679 B1
(45) Date of Patent: Jul. 14, 2009

(54) 3D CAMERA

(75) Inventor: Roman C. Gutierrez, Arcadia, CA (US)

(73) Assignee: Siimpel, Inc., Arcadia, CA (US)

( * ) Notice: Subject to any disclaimer, the term of this patent is extended or adjusted under 35 U.S.C. 154(b) by 154 days.

(21) Appl. No.: 11/416,882

(22) Filed: May 2, 2006

Related U.S. Application Data

(60) Provisional application No. 60/679,486, filed on May 10, 2005.

(51) Int. Cl.
- *H01L 27/00* (2006.01)
- *G01J 3/50* (2006.01)
- *G02F 1/01* (2006.01)
- *G01C 3/08* (2006.01)
- *H04N 9/083* (2006.01)

(52) U.S. Cl. .................... 250/208.1; 250/226; 250/330; 356/5.08; 348/281

(58) Field of Classification Search ............ 250/208.1, 250/216, 226, 221, 330, 336.1; 348/289, 348/290, 294, 270–279; 356/402, 404, 414, 356/416, 419, 3–9; 257/294, 431–432, 290–291, 257/440

See application file for complete search history.

(56) References Cited

U.S. PATENT DOCUMENTS

| | | | | |
|---|---|---|---|---|
| 5,166,784 | A | * | 11/1992 | Suda et al. ............ 358/500 |
| 6,759,646 | B1 | * | 7/2004 | Acharya et al. .......... 250/226 |
| 2004/0256561 | A1 | * | 12/2004 | Beuhler et al. ......... 250/339.05 |
| 2007/0247611 | A1 | * | 10/2007 | Tamaki et al. .......... 356/3.11 |

* cited by examiner

*Primary Examiner*—Georgia Y Epps
*Assistant Examiner*—Don Williams
(74) *Attorney, Agent, or Firm*—Haynes & Boone, LLP.

(57) ABSTRACT

Structures and methods are provided for obtaining depth information regarding a scene being imaged. The scene is illuminated with light having a time varying parameter. Light reflected from the scene is received and values for the time varying parameter associated with different portions of the scene are determined.

17 Claims, 4 Drawing Sheets

3D CAMERA

CROSS-REFERENCE TO RELATED APPLICATIONS

This patent application claims benefit of U.S. Provisional Application No. 60/679,486, filed May 10, 2005; and entitled "3D CAMERA", the entire contents of which are hereby incorporated by reference.

TECHNICAL FIELD

The present invention relates generally to imaging systems. The present invention relates more particularly to a three dimensional (3D) camera that uses a tunable laser and coherent detection to provide depth information.

BACKGROUND

Digital cameras are well known. As their cost continues to drop, digital cameras grow in popularity. Digital cameras eliminate the need to have film developed. They also greatly reduce the need to have prints made, since digital pictures can be viewed on a computer monitor or the like. Although the initial cost may be higher, digital cameras have greatly reduced the overall cost of photography.

It has been estimated that about 100 billion photographs are taken each year world-wide. The use of digital cameras is expected to exceed the use of film cameras for the first time in 2004.

Digital cameras have widespread applications. Digital cameras can be used in amateur and professional photography. They can also be used in various industrial applications, such as machine vision.

With current digital photography resolutions exceeding 10 megapixels, the ability to capture the detail of a scene is incredibly good. Yet, existing photographs typically lack important information regarding the objects in an image. For example, typical contemporary photographs do not capture the three dimensional shape or size of object, because the image is recorded in a flat, two-dimensional fashion.

Contemporary three-dimensional cameras are known. However, state-of-the-art ranging systems based on complimentary metal oxide semiconductor (CMOS) imagers use time-of-flight (TOF) techniques to obtain depth information. According to this approach, a short pulse of light is sent to the scene to provide depth information. A very fast shutter is used in front of the CMOS imager to time the roundtrip distance to the different portions of the scene.

Since light travels at 300,000,000 meters/sec, a 1 millimeter change in scene distance corresponds to a mere 6 picoseconds in round trip time. As a result, time-of-flight techniques typically are limited to about 1 centimeter of resolution and 30 centimeters of measurement range.

In addition, due to the short time the shutter is open, time-of-flight techniques require a very bright light source. Of course, brighter light sources consume more power and cause concerns regarding eye safety.

In order to measure the short time delays, time-of-flight techniques further require the use of high-speed electronics that are expensive and consume a comparatively great amount of power. These factors make time-of-flight techniques expensive, bulky, and not well suited for the consumer camera market.

Thus, although such contemporary digital imaging systems have proven generally suitable for their intended purposes, they possess inherent deficiencies which detract from their overall effectiveness and desirability. Moreover, although the prior art has recognized, to a limited extent, the advantages of three dimensional imaging, the proposed solutions have, to date, been ineffective in providing a satisfactory remedy. Therefore, it is desirable to provide a three dimensional camera that uses improved techniques to obtain depth information regarding a scene being photographed.

BRIEF SUMMARY

According to one aspect of the present invention, a three dimensional image can be formed by using visible light to provide a two dimensional image in a conventional manner and by using time varying invisible light in combination with reference light to provide depth information for objects in the two dimensional image. The time varying invisible light illuminates a scene being photographed. Time varying invisible light that is reflected from the scene is combined with reference light and imaged. Combining the time varying light with the reference light facilitates the determination of the amount of variation in the time varying light. The amount of variation in the time varying light is representative of the depth information.

In one embodiment, both the invisible light that illuminates the scene and the reference light comprise near infrared light that is linearly swept in frequency. Both the invisible light that illuminates the scene and the reference light are produced by the same frequency tunable laser. The combined reflected light and reference light are imaged on a complimentary metal oxide semiconductor (CMOS) imaging sensor that is simultaneously also being used to image visible light. An infrared-red-green-blue (IRGB) filter facilitates the definition of pixels of the imaging sensor that permit the simultaneous acquisition of two dimensional images and depth information. The reflected time varying light is combined with the reference light to define a beat frequency for each pixel. The beat frequency is measured by a dedicated frequency counter for each pixel. The beat frequency is representative of depth information.

The use of time varying light in this manner eliminates the need for a difficult time measurement by using an easier and more precise frequency measurement instead. Thus, better resolution of the depth information is obtained and the electronics required for depth measurement are simplified.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

Figure 1:
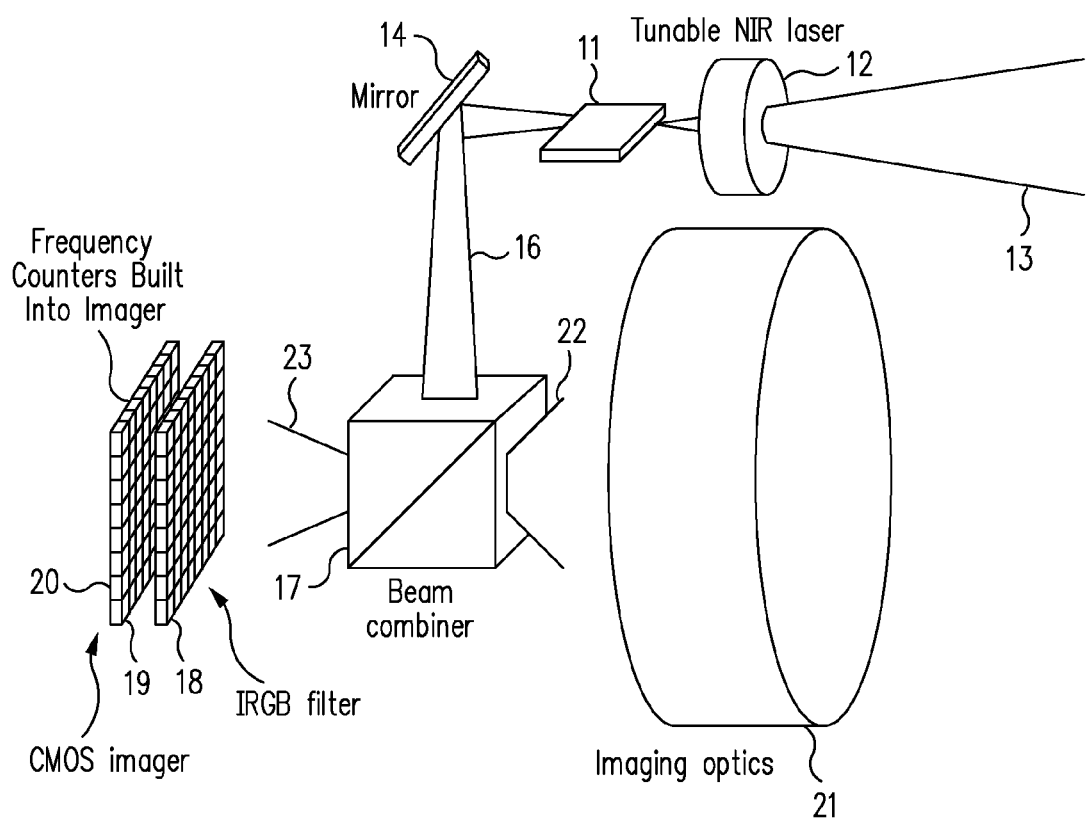
FIG. 1 is a semi-schematic, perspective view showing some of the components of an exemplary embodiment of a three dimensional camera according to one aspect of the present invention.

According to one aspect, the present invention uses a tunable laser and coherent detection to convert the time delay associated with depth information into frequency modulation. As a result, what was a very difficult 6 picosecond resolution time measurement according to contemporary time-of-flight methodology becomes a very simple 1 kilohertz resolution frequency measurement according to one aspect of the present invention.

More particularly, according to an exemplary embodiment of the present invention, the entire scene being imaged is illuminated with infrared light that is swept in frequency during the exposure period of the imaging process. A traditional two dimensional image is formed on RGB color sub-pixels, substantially according to contemporary methodology. At the same time, an image containing depth information is formed on infrared sub-pixels using the reflected infrared beam. Depth information is obtained by counting the frequency of the reflected infrared light for each pixel of the imager.

A plurality of individual sub-pixels, each of which is responsive to a different color, make up a single pixel. A pixel, according to one aspect of the present invention, comprises an infrared sub-pixel, a red sub-pixel, a green sub-pixel, and a blue sub-pixel, as discussed in detail below.

Reflected light from points in the scene that are farther away from the camera takes longer to make the round trip than reflected light from points that are closer to the camera. Thus, the frequency sweep of the illuminating infrared radiation sweeps or progresses more in frequency for light that is reflected from more distant parts of the scene than for light that is reflected from less distant parts of the scene.

The traditional two dimensional information of the RGB color sub-pixels, combined with the infrared depth information of the infrared sub-pixels, provides pixels that each have three dimensional information.

Thus, the prior art process of sequentially scanning the scene in a raster scan-like process is replaced with illuminating the entire scene simultaneously with infrared radiation. Also, the prior art process of performing a difficult time-of-flight measurement of the scan beam to obtain depth information is replaced with determining the frequency of the infrared radiation reflected from each portion of the scene.

Frequency measurement according to one aspect of the present invention provides a large dynamic range. Therefore, 1 millimeter spatial resolution of an object being imaged is possible in a 5 meter measurement range (distance from the camera to the object).

In addition, because coherent detection provides a 1,000 times improvement in signal to noise ratio, and because the frequency measurement is compatible with long (>1 millisecond) shutter speeds, the intensity of the light source needed for the infrared-red-green-blue (IRGB) methodology of the present invention is much lower than for time-of-flight methodology. As a result of these advantages, the IRGB filtering technique of the present invention is well suited for small, portable, digital cameras that have widespread market acceptance.

As used herein, a scene is defined to include any object or collection of objects that may be imaged with a camera. Although not required, a scene often has a background. A scene typically has three dimensions. Thus, a scene typically has a depth component according to which portions of the scene have different depths with respect to one another and therefore have different distances to the camera. The distinction between scenes and objects is not always important and these terms may sometimes be used interchangeably herein.

Examples of objects in scenes include electronic components, automobile parts, people, cars, trees, houses, and mountains. Examples of backgrounds include parts bins, containers, pick and place devices, printed circuit boards, streets, landscapes, and the sky.

In machine vision applications, a scene typically comprises an object and a background. For example, the object may comprise a packaged integrated circuit and the background may comprise a printed circuit board.

Figure 2:
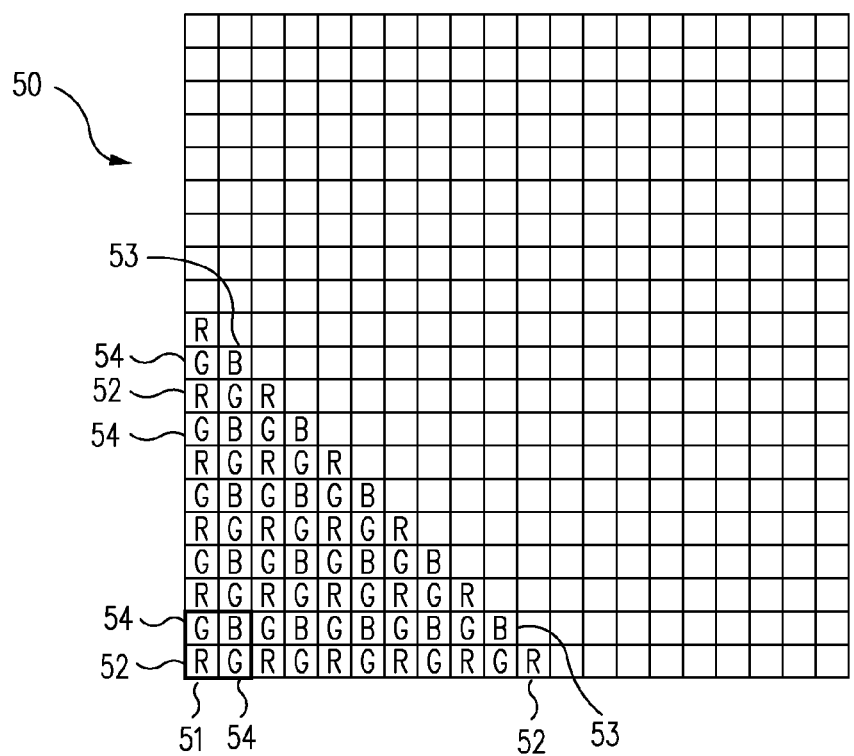
FIG. 2 is a plan view of an exemplary portion of a contemporary red-green-blue (RGB) filter for a digital imaging sensor wherein exemplary sub-pixels thereof are labeled R for red, G for green, and B for blue.
Figure 3:
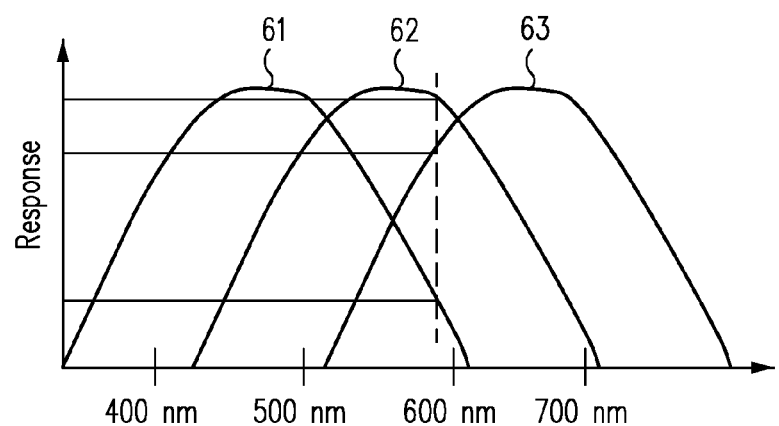
FIG. 3 is a chart showing a frequency response for a contemporary red-green-blue (RGB) filter, such as that shown in FIG. 2.

One embodiment of the present invention is illustrated in FIGS. 1 and 4-6. FIGS. 2 and 3 depict information regarding a contemporary RGB filter.

Referring now to FIG. 1, an exemplary embodiment of the three dimensional digital camera of the present invention is shown. The present invention uses infrared-red-green-blue (IRGB) filtering and sensing technology, combined with a tunable near infrared laser.

The camera comprises a CMOS imager 19 having an IRGB filter assembly 18 formed on the front thereof and having a frequency counter assembly 20 formed on the back thereof.

A tunable near infrared laser 11 provides an illumination beam 13 to projection optics 12, from which the beam is projected onto a scene to be imaged. The laser 11 also provides a reference beam 16 to the CMOS imager 19, such as via beam combiner 17. The beam combiner 17 combines the reference beam 16 with light 22 focused from the scene by imaging optics 21. Thus, the beam combiner 17 provides a combined beam 23 to the CMOS imager 19.

The light 22 from the scene comprises both visible light from the scene and near infrared light from the laser 11 that was reflected from the scene. The visible light from the scene facilitates traditional two dimensional imaging, as discussed in detail below. The infrared light facilitates the determination of depth information for three dimensional imaging, as also discussed in detail below.

The laser 11 is used to illuminate the scene with infrared light 13 at changing wavelengths. The sweep rate of the wavelengths must be fast enough to ensure that there is a detectable difference in wavelength for the parts of the object that are at different distances from the camera.

While the majority of the emitted light from the laser 11 is used to illuminate the scene, a portion of the emitted light is used as the local oscillator (LO) for coherent detection. That is, light output from the laser 11 is taken from both ends of the laser 11 or is otherwise split so as to form a reference beam with respect to which the light that is reflected from the scene interferes so as to facilitate depth determination. The local oscillator light or reference beam 16 is reflected by a mirror 14 and combined with the laser light reflected from the scene with the beam combiner 17. The beam combiner 17 can be part of the imaging optics 21 of the camera. The imaging optics 21 captures the light reflected by the scene and images the scene, through the IRGB filter 18, onto the CMOS imager 19.

The light 22 coming from the scene includes the ambient visible light, as well as the infrared laser light reflected by the scene. The infrared laser light reflected from the scene is combined with the reference light 16 emitted by the laser 11 for a given interval of time (the exposure period). Thus, the reference light 16 is mixed or interfered with the infrared light reflected from the scene. This optical mixing produces an intensity modulation of the infrared light at a beat frequency, according to well known principles. This beat frequency is then detected using, for example, frequency counters at each pixel on the CMOS imager. Simultaneously, the CMOS imager also captures the color and intensity of the visible light using the RGB filters.

The filter 18 of the present invention has a different configuration from that of contemporary filters. An infrared sub-pixel or element 105 (FIG. 4) replaces one of the two green sub-pixels or elements 54 (FIG. 2) in each pixel 101 (wherein a pixel is a group of four nearby sub-pixels that generally sense different colors), as discussed in detail below. The composition of the infrared filter is different from that of the color filters, and so its deposition and patterning require additional steps in the fabrication of the image sensor. Both the deposition and the patterning steps include standard lithographic processes and can typically be integrated as post processing of a contemporary imaging die.

In another embodiment, a filter is used to filter out all IR light, except at a wavelength that corresponds closely with the infrared laser light. At this wavelength all of the light passes through and is sensed by every pixel (red, green, or blue) on the CMOS imager. In this embodiment, every pixel may have a frequency counter to provide higher resolution for 3D imaging. The infrared laser light is chosen of sufficiently low intensity so as to not affect the color sensing. Alternatively, the laser light is turned off when sensing the color of the scene.

Although infrared filters are well known, infrared filters have not previously been provided in such a pixilated format. More particularly, the present invention uses a pixilated IRGB filter.

According to one aspect of the present invention, the infrared element or sub-pixel in each pixel is not read out in the same fashion as the color elements or sub-pixels. In the color sub-pixels, photoelectrons are accumulated through the duration of a frame, and subsequently are read out at the end of the frame to yield the total energy of the incident light. However, in an infrared sub-pixel, photoelectrons generate a photocurrent that is fed into a frequency counter. Each pixel may have a 4-digit CMOS frequency counter. Such counters are cheap and commonplace as ICs, but have not previously been fabricated in a pixilated format.

To achieve sub-millimeter resolution in range or depth information, a continuous wavelength tunable near infrared (NIR) laser with a very fast wavelength sweep can be used. An optical frequency sweep rate of approximately 125 Terahertz/second, a wavelength sweep range of approximately 40 nanometers, a power of approximately 10 milliwatts, and a noise intensity of approximately −152 dB/Hz is used in one example. This may be accomplished using a micro electro-mechanic systems (MEMS) external cavity tunable laser. Such a laser can be configured to operate at a frequency suitable for silicon detectors, e.g., at a wavelength of 980 nm or less. Other laser tuning methods, such as thermal tuning, current tuning, or acoustooptic frequency shifting can also be used.

Contemporary laser metrology depends on scanning for imaging. However, according to one aspect of the present invention, the entire field is imaged instantaneously. A concern with this non-scanning approach is that the reflected signals may be weak, since the illuminating infrared beam must be expanded and since laser intensity must be kept low to avoid eye damage.

This concern is mitigated by using coherent detection. Coherent detection can be used to detect very weak signals compared to incoherent detection, with a factor of one thousand for signal detection improvement for the same conditions. This is due to several reasons. First, a mode of operation called LO (local oscillator) shot noise limited (SNL) method may be employed. This is possible because both the signal power (square of the current) and the LO shot noise power in the detector's output are proportional to the incident LO optical power. The LO power may be increased until the LO shot noise dominates the other noise sources, such as background light, dark current, Johnson (thermal) noise, and amplifier noise. The signal power increases automatically with the LO shot noise power. This procedure, equivalent to setting the other noise sources to zero, can greatly increase the SNR.

Second, the oscillating signal at the detector output is only due to photons which are spatially phase matched to the LO, effectively eliminating noise from background light at other wavelengths and from other directions. Therefore, coherent detection is not degraded by daytime operation.

If the object is moving while being imaged, its motion results in an additional Doppler frequency shift. By comparing the beat frequencies obtained by sweeping the laser wavelength in the positive and negative directions, the Doppler shift can be eliminated.

The present invention provides a three dimensional camera based on the IRGB imaging technology to create accurate color digital photographs and video that are recorded in three dimensions. The present invention provides an IRGB based three dimensional digital camera that is a comparatively compact and highly effective tool for three dimensional image and three dimensional motion acquisition, analysis, measurement and visualization.

More importantly, these three dimensional products will be about as affordable and simple to use as existing two dimensional digital cameras and camcorders. For example, a one megapixel camera provides 16 bit color and 13 bit distance information (range) simultaneously for the entire image. This technology produces images that are dramatically more accurate and detailed and more useful for the users.

According to one aspect of the present invention, an IRGB CMOS imager detects both infrared (IR) and visible radiation (red, green and blue) simultaneously. Information received from the infrared sensor is used to determine the distance to the target, while the visible light sensor provides the color information of the target. These data are then combined to produce a true color photograph with sub-millimeter surface shape information. This development is made possible only with recent innovations in tunable lasers, metrology and CMOS imagers.

According to one aspect of the present invention, an object is illuminated using a tunable near infrared (NIR) laser that is linearly sweeping (changing) its emitted wavelength at a high rate.

Due to the finite speed of light, at any point in time, the wavelength of light that travels to the scene and returns to the camera lags the wavelength being emitted by the laser. This offset is proportional to the distance between the camera and scene.

The distance to the object is determined by coherent detection method that interferes the light reflected from the targets with light that is more directly emitted from the laser. As the two light signals interfere, the intensity of the light is modulated at a frequency proportional to the wavelength difference between the two light signals and hence producing the distance information.

A commercial silicon CMOS imaging sensor may be modified to measure the frequency of the modulations by building a frequency counter into every infrared pixel. In this manner, high definition, accurate and brilliant color photographs are recorded in three dimensions without substantially increasing the size or cost of current digital cameras. The IRGB filtering technology of the present invention facilitates the combination of the recent advances in tunable lasers with CMOS imaging sensors to provide such three dimensional imaging.

Referring now to FIG. 2, imaging sensors for contemporary digital cameras have three different color filters 52, 53, and 54 to determine the color for each pixel 51 in an image. These sensors are commonly called RGB sensors, since they correspond to detecting red, green, and blue colors. In FIG. 2, the red sub-pixels are labeled R, the blue sub-pixels are labeled B, and the green sub-pixels are labeled G.

For most current CMOS imaging sensors, these filters are applied to all the pixels in a tiled mosaic pattern, as illustrated in FIG. 2. An RGB pixel, comprised of four sub-pixels (one corresponding to a blue filter 53, two corresponding to green filters 54, and one corresponding to a red filter 52), provides a full color representation of the image at a particular location. Currently, CMOS imaging sensors can have more than 10 million RGB pixels, providing very high-resolution pictures.

Referring now to FIG. 3, a contemporary RGB imaging sensor detects the color of light and the intensity simultaneously by measuring the amount of light through three different color filters such as the blue filters 53, the green filters 54, and the red filter 52 shown in FIG. 2. The response for the sensor behind each of these three filters is indicated by the curves 61 (blue), 62 (green), and 63 (red).

For a particular color of light, shown by the dashed vertical line in FIG. 3, each color filter has a different response. Thus, most visible colors can be uniquely sensed as a particular combination of RGB intensities according to well know principles. This process for determining the color of an object is similar to how the human eye senses colors. As a result, the colors detected by an RGB sensor very closely match the colors that we see.

Figure 4:
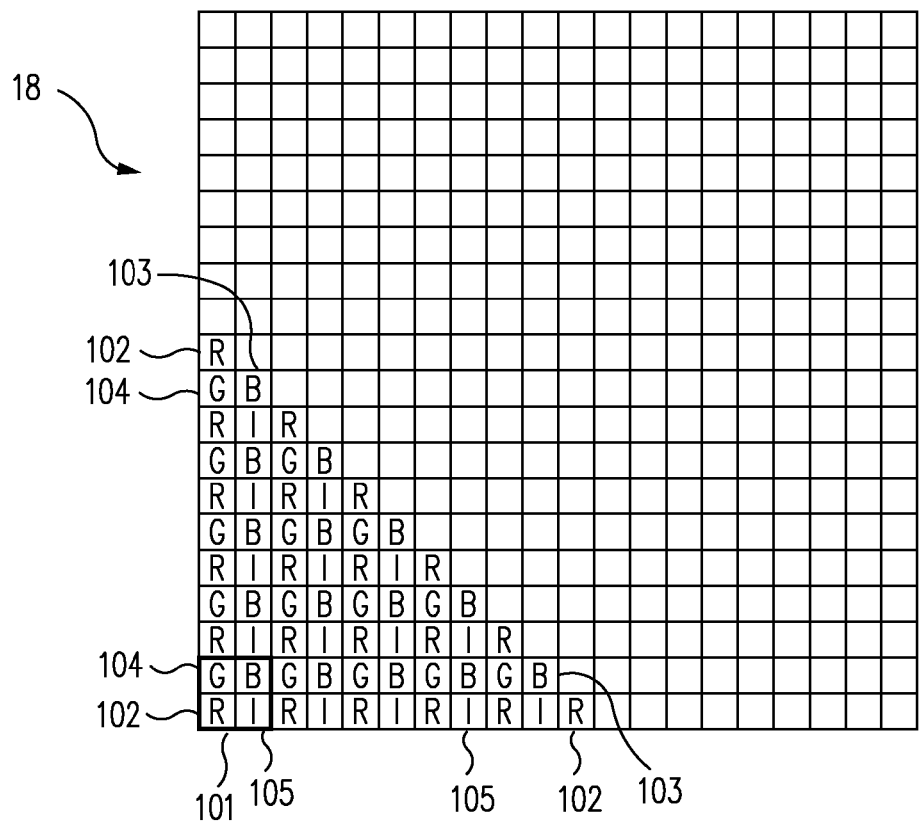
FIG. 4 is a plan view of an exemplary portion of an infra-red-red-blue-green (IRGB) filter for a digital imaging sensor according to one aspect of the present invention, such as that of FIG. 1, wherein exemplary sub-pixels thereof are labeled I for infrared, R for red, G for green, and B for blue.

Referring now to FIG. 4, the IRGB imaging sensor of the present invention has infrared 105, red 102, green 104, and blue 103 filters applied to an array of pixels in a tiled mosaic pattern. Each IRGB pixel determines the color (via the red, blue and green filters) and distance (via the infrared filter) for one part or pixel of the object being imaged. In FIG. 4, the infrared sub-pixels are labeled I, the red sub-pixels are labeled R, the blue sub-pixels are labeled B, and the green sub-pixels are labeled G. Thus, the IRGB CMOS imager of the present invention comprises sensors that detect both infrared radiation, as well as red, green and blue colors. The infrared sub-pixels are used to determine the distance to the portions of the scene being imaged. The RGB sensors determine the colors of the scene in the fashion of a contemporary digital camera. The data from the infrared sub-pixels and the data from the visible color sub-pixels are combined to produce a true color photograph with sub-millimeter surface shape information, i.e., a three dimensional image.

The infrared sensor determines range using a tunable near infrared laser. If an object is illuminated by an infrared tunable light source that is linearly changing its emission wavelength at high rate, then the wavelength of the light that is illuminating each part of the object at any point in time depends on the distance of the object to the light source.

Figure 6:
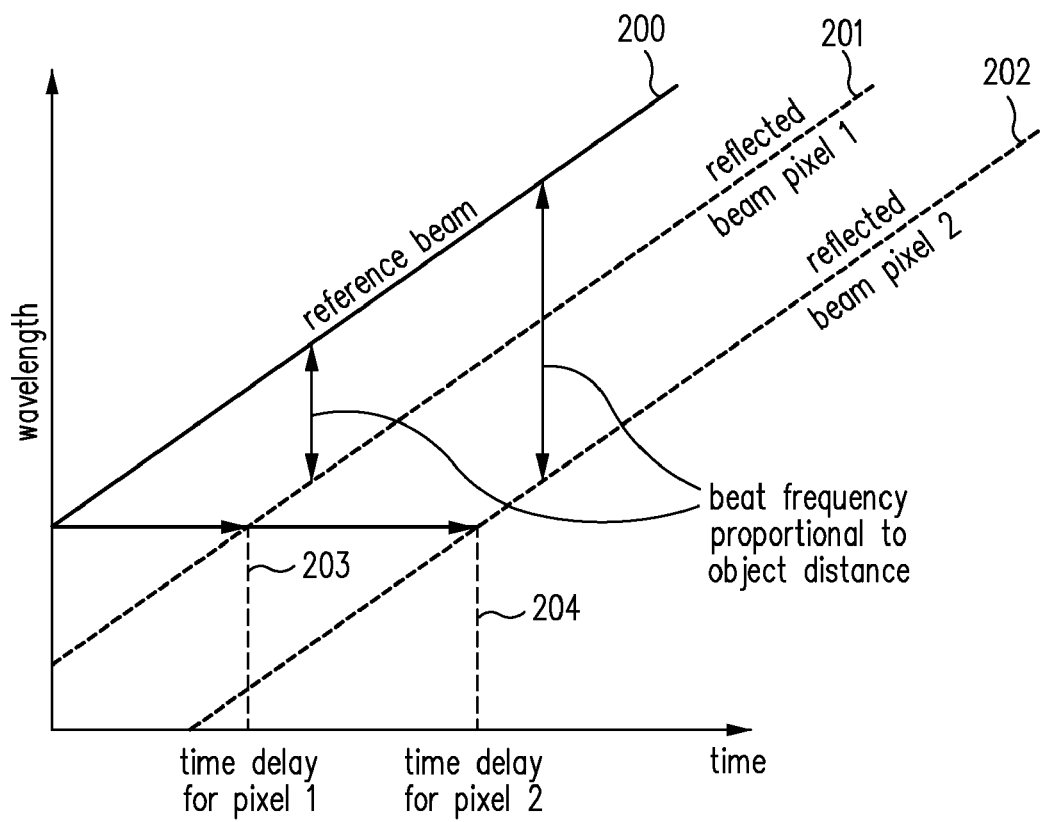
FIG. 6 is a chart showing how the beat frequency of the interfering reflected beam and reference beam is related to the depth information of a scene.

This is because the light takes a different amount of time to transverse the distance from the laser to each part of the object. In turn, the wavelength of the light reflected from the object back to the imager also depends on the distance between the imager and the object, as illustrated in FIG. 6 and discussed in detail below.

Due to the time delay for light traveling to and from the object, the wavelength of the reflected beam received by the camera is different from the wavelength of the light emitted by the laser at that particular instance. The interference of the reference beam and the reflected infrared light at each pixel of the imager generates a "beat" signal. The beat frequency of the beat signal will be different for each pixel, and is proportional to the distance to the part of the object imaged by that pixel. Thus, by using a tunable laser, range information is transformed to the frequency domain which can be quantified more precisely than time of flight information in time domain.

Figure 5:
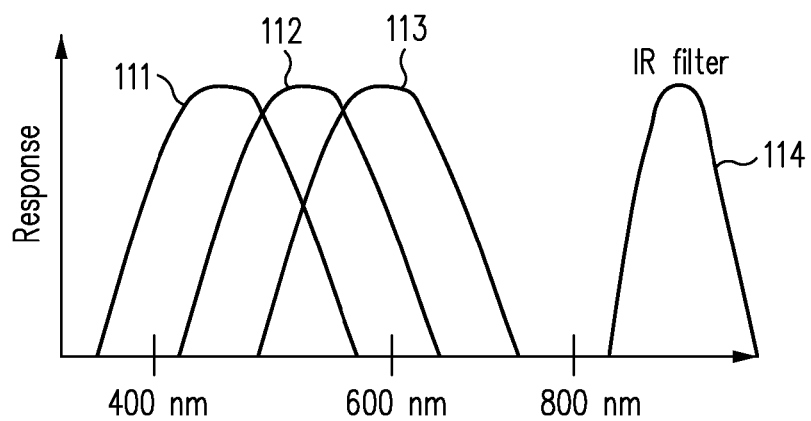
FIG. 5 is a chart showing an exemplary frequency response for an infrared-red-green-blue (IRGB) filter, such as that shown in FIG. 4.

Referring now to FIG. 5, the wavelength of the infrared light used to obtain depth information must be far enough spectrally from the red filter so as not to interfere with the color measurement, but also must generally be shorter than about 1000 nm in order to be sensed by the silicon CMOS imager.

The blue 111, green 112, and red 113 sensor responses overlap, so as to provide color imaging, as discussed with respect to FIG. 3 above. However, the infrared sensor response 114 is spaced away from the visible color responses so as to inhibit undesired interference between responses to the visible wavelengths that are used to form the two dimensional image and the infrared wavelengths that are used to form the depth information of the three dimensional image.

Referring now to FIG. 6, a chart shows how differences in the time delays between reflected infrared light beams provide depth information. Since the infrared light from the three dimensional camera of the present invention is being swept in frequency, during the exposure time of the camera some portions of the scene will have reflected earlier frequencies in the sweep, while other portions of the scene will have reflected later frequencies in the sweep.

If the infrared beam is being swept such that it is increasing in frequency, then during the exposure, time portions of the scene that are closer to the camera will have reflected infrared light having a lower frequency than the infrared light reflected by portions of the scene that are further away from the camera. Thus, the range to different portions of the scene can be obtained by determining the wavelength of the infrared light detected by the IRGB sensor.

Thus, at time equal zero, the reference beam 200 begins sweeping and the illumination beam also begins sweeping. The illumination beam is reflected from a first portion of the scene to provide the reflected beam for pixel 1 (201) before it is reflected from a second portion of the scene to provide the reflected beam for pixel 2 (202).

Since the illumination beam is reflected from the first portion of the scene earlier, the frequency of the reflected light for pixel 1 is lower than that for pixel 2 (if the sweep is a sweep of increasing frequency). The beat frequency created by the interference between the reflected beams and the reference beam can thus be used to determine the differences in distance between the camera and the two scene portions.

According to one embodiment of the present invention, a scene is illuminated by a tunable near infrared laser that is linearly sweeping its emission wavelength at a high rate. Due to the finite speed of light, at any point in time, the wavelength of the light that travels to the object and then scatters back to the camera lags the wavelength being emitted by the laser. This offset is proportional to the distance between the camera and object.

Distance is determined using coherent detection by interfering the light reflected by the object and collected by the camera with light more directly emitted from the laser at that instance in time.

As the two light signals interfere, the intensity of the light is modulated at a beat frequency proportional to the wavelength difference between the two light signals, producing the distance information.

A modified commercial silicon CMOS imager that has a frequency counter built into every infrared pixel can be used to measure the frequency of the light intensity modulations. The infrared pixel provides frequency information rather than intensity information. The infrared pixel and color pixels may be combined if the two measurements are done one after the other.

An important aspect of the three dimensional camera is the method by which it transforms distance to a quantity measurable within the camera. In order to have a constant beat frequency without shuttering the detector or pulsing the laser, a linear frequency sweep may be used:

$$f_r(t) = f_i + f't$$

where $f_r$ is the instantaneous frequency, $f_i$ is the initial frequency, and $f'$ is the sweep rate.

For light reflected off the object onto a particular pixel of the detector, the frequency, $f_o$, is:

$$f_o(t) = f_i + f'(t - 2d_o/c)$$

where c is the speed of light, $d_o$ is the distance between the camera and the part of the object in that pixel's field of view.

There are two other contributions to the intensity at the detector: the reference beam at frequency $f_r$ and the incoherent ambient light. The reference beam demodulates the light reflected from the object, producing sinusoidal intensity fluctuations or beats with frequency proportional to the distance:

$$f_b = \frac{2f'd_o}{c}$$

The beat frequency, $f_b$, can easily be measured by detection of peaks or zero-crossings. Fluctuations in the laser frequency on timescales shorter than an exposure can be tolerated because the counting technique gives the time-averaged frequency over the entire exposure.

To measure range to an accuracy of $d_{oe}$, we need to measure the beat frequency to an accuracy of:

$$f_{be} \approx \frac{2f'd_{oe}}{c}$$

Since a fractional frequency error is equal to a fractional distance error, the goal of 1 millimeter accuracy requires a frequency counter accurate to 4 digits. Provided the signal-to-noise ratio is greater than ~2, frequency can be measured simply by counting the number of zero-crossings in a fixed time interval. Then the exposure time required to achieve the desired accuracy is:

$$t_e \approx f_{be}^{-1}$$

In order to achieve a range accuracy of 1 mm, or 200 parts per million, in an exposure time of only 1/60 second, we require a maximum beat frequency of 300 kilohertz at maximum range. State-of-the-art megapixel CMOS imagers have frame rates limited to 500 frames per second, but 4-digit frequency counting ICs are readily available at 20 Megahertz.

To achieve this beat frequency at 5 meters, the associated optical frequency sweep rate is 9 terahertz/second. The maximum exposure time for a monotonic linear frequency sweep is:

$$t_e = \frac{\Delta f_{max}}{f'}$$

The 40 nanometer wavelength range of typical tunable lasers is wide enough to allow sweeps as long as 1 s at the 9 terahertz/second rate. Thus, if a frequency counter is integrated into each imager pixel, and a tunable laser for 980 nanometer with above specifications is used, range information with an accuracy of 1 millimeter can be obtained for each pixel in an exposure time suitable for photography.

When the object is moving, this motion results in an additional Doppler frequency shift. The beat frequency, and thus the interpolated range is modified by motion in the scene:

$$f_b = \left| \frac{2f'd_0}{c} + \frac{2v}{c} f_i \right|$$

where v is the object velocity.

Its contribution to the inferred distance is:

$$d_d = \frac{v}{f'} f_i$$

For a 9 terahertz/second sweep and a velocity of 0.1 meter/second, this contribution is 3.4 meter. By comparing the beat frequencies obtained by sweeping in the positive and negative directions, we can easily eliminate the Doppler shift and obtain the true distance:

$$d_0 = \frac{c}{2f'} |f_b^+ - f_b^-|$$

However, velocity variation between up and down sweeps introduces errors in the above calculation, and thus the distance as well. Alternatively, we can eliminate the distance and obtain the velocity:

$$v = \frac{c}{2} |f_b^+ + f_b^-|$$

If our performance goals are met, in this mode of operation the camera can effectively measure velocities in the sub-millimeter/second range while simultaneously measuring distance with mm accuracy.

The three dimensional camera requires an illuminator of sufficient strength at 5 m range to achieve signal-to-noise ratios suitable for frequency counting. The reflected signal will be weak due to the distance and the diffuse reflectivity of the object. Its intensity will vary from pixel to pixel according to the reflectivity of the scene. Hence there will be a lower limit to the brightness of an object below which range information will not be available, just as color information is lost in dark regions of a conventional photograph.

If the object is not moving, the optical amplitude is given by:

$$E_{tot} = E_r e^{i(2\pi(f_i + f')t - kz)} + E_o e^{i(2\pi(f_i + f't - 2d_o/c)t - kz)} + E_a$$

where $E_r$, $E_o$, and $E_a$ are the amplitudes of the reference beam, the beam reflected off the object, and the ambient light, respectively. The time dependence of $E_a$ is not shown, but it is not coherent with the illuminator.

The detected intensity is given by:

$$I_{tot} = E_r^2 + E_o^2 + E_a^2 + 2E_r E_o \cos(2d_o f't/c)$$

To avoid wasting light, the illuminator should target an area equal to the field of view of the camera. Assuming diffuse reflection, the reflected power received by the camera is:

$$P_o = \frac{P_i \rho}{2\pi d_o^2} A_l$$

where $P_i$ is the illuminator power, $\rho$ is the reflectivity of the object, and $A_l$ is the aperture of the collection lens. At 980 nm, semiconductor lasers are available at powers exceeding 400 mW. According to the ANSI standard for laser safety, the eyesafe intensity limit for a $\frac{1}{60}$s exposure is 18 mW/cm$^2$.

To comply with this standard, to be eye safe at the aperture, a 400 mW illuminator must emerge from an aperture of ~22 cm$^2$, which is comparable to an external camera flash. The signal power received by a pixel is given by:

$$\Phi_o = P_o/N$$

For an object of reflectivity $\rho = 0.1$ at 5 m and a camera aperture of 12 cm$^2$ (radius ~2 cm), the received power per pixel is 310 fW. To generate the reference beam, the reference portion $P_r$ of the laser is expanded over the area of the imager, giving a reference signal per pixel of $$\Phi_o = P_r/N$$

or 400 nW with the above parameters.

When the reference and reflected beams are combined, the amplitude of the beats, measured as a sinusoidal intensity variation, is $$I_b = 2\sqrt{\Phi_r \Phi_o}$$

The advantage of coherent detection is clear, since the strength of the beat signal is proportional to the reference beam intensity, which can be made very high because the beam does not leave the camera. If 10% of the illuminator power is used for the reference beam, then the amplitude of the beat signal expressed as power per pixel is 220 pW, or ~1000× the power received from the reflected beam.

Noise sources include shot noise, detector noise, laser intensity fluctuations, wavelength fluctuations, and fluctuations in the ambient light level. The shot noise is a fundamental physical limit that results from the fact that the photoelectrons are discrete. Using coherent detection, all the other noise sources can be made negligible in comparison simply by choosing an appropriate reference beam power.

For the beat measurement, the signal-to-noise ratio for shot noise is proportional to the intensity of the reflected beam:

$$\frac{S}{N} = \frac{\Phi_o \eta}{Bhf}$$

Where $\eta$ is the quantum efficiency, B is the measurement bandwidth and h is the Planck's constant. For frequency counting, the measurement bandwidth is equal to twice the beat frequency to be measured, or 600 kHz for the above parameters. For a detector having quantum efficiency of 0.95 at 980 nm, at an illuminator power of 400 mW, the S/N ratio is 2.5 for an object of reflectivity 0.1 at 5 m.

State-of-the-art tunable telecom lasers have line widths of ~125 kHz, corresponding to a characteristic fluctuation time of >8 μs. Since this time is much longer than the 33 ns delay between the reference beam and the reflected beam at 5 meters, wavelength fluctuations have negligible effect on the range measurement. The contributions of ambient light fluctuations are negligible due their slow timescale, and the narrow band infrared filter to reduce intensity at the ranging pixels.

In a traditional color imager, dark current is a significant problem due to the fact that it adds to all three color signals. In the proposed ranging system, since the measurement is AC, only the fluctuations in dark current contribute. Since dark photocurrent fluctuations are orders of magnitude smaller than the beat amplitudes discussed above, their contribution will be negligible.

According to one aspect, the present invention comprises a method for obtaining depth information regarding a scene being imaged, wherein the method comprises illuminating the scene with light having a time varying parameter, receiving light reflected from the scene, and determining values for the time varying parameter associated with different portions of the scene.

According to one aspect, the present invention comprises a method for forming a three dimensional image, wherein the method comprises filtering visible light onto selected elements of an imaging sensor and filtering time varying invisible light onto other elements of the sensor.

According to one aspect, the present invention comprises a method for obtaining three dimensional image information, wherein the method comprises both imaging visible light and imaging a combination of time varying invisible light and reference light.

The time varying invisible light is used to illuminate the scene being imaged. Time varying invisible light that is reflected from the scene is combined with reference light and is imaged to provide depth information, as described in detail below.

In different embodiments, the reference light can also be time varying. The reference light and the time varying invisible light can vary in the same manner. The reference light and the time varying light can come from the same source.

Alternatively, the reference light can be time varying and the invisible light that is reflected from the scene and combined with the reference light is not time varying.

Thus, one of the two beams may alternatively be maintained at a substantially constant wavelength while the other varies over time, if desired. At least one of the reference light and the invisible light that is reflected from the scene is time varying. Having both beams vary over time, such as by varying in wavelength, desirably allows the output from a single laser to be utilized.

Imaging the combination of the time varying invisible light and the reference light can comprise illuminating a scene with invisible light having a time varying parameter, receiving invisible light reflected from the scene, and determining a plurality of values for the time varying parameter associated with different portions of the scene, the values being representative of depth information.

Imaging the combination of time varying invisible light and reference light provides an indication of an amount of change in the time varying parameter of the reflected light with respect to the reference light. The amount of change in the time varying parameter of the reflected light is representative of (typically proportional to or inversely proportional to) depth information of the scene.

The reference light can comprise invisible light. Thus, the reference light does not undesirably affect the formation of the two dimensional image. That is, information regarding the two dimensional image and information regarding depth are obtained on different sub-pixels or light imaging elements of the imaging sensor with little or no crosstalk due to filtering of the light before images are formed on the imaging sensor.

The reference light and the time varying light can comprise infrared light, such as near infrared light. However, those skilled in the art will appreciate that other wavelengths of electromagnetic radiation may alternatively be used.

The reference light and the time varying light comprise coherent light, such as that produced by a laser. As mentioned above, the reference light and the time varying light can come from the same laser. In this manner, the coherence of the reference light with respect to the time varying light tends to be maximized.

Imaging the combination of time varying invisible light and reference light can comprise providing a time varying reference beam and a time varying reflected beam from the same laser, combining the reference beam and the reflected beam to form a combined beam, and imaging portions of the combined beam upon selected sub-pixels of a sensor.

The time varying invisible light and the reference light interfere when imaged. The amount of interference is indicative of depth information. Interference of the time varying invisible light and the reference light defines a beat frequency when imaged. The beat frequency is dependent upon the difference in wavelengths of the time varying invisible light and the reference light. The difference in wavelengths is dependent upon the length of the round trip of the invisible beam from the camera to each portion of the scene and back. The beat frequency is thus indicative of depth information.

The time varying light can vary in frequency over time. Alternatively, the time varying light may vary in any desired combination of amplitude, frequency, and/or phase. The time varying light can be swept in frequency over at least a portion of an exposure time. The time varying light can be swept linearly in frequency over at least a portion of an exposure time.

Imaging the visible light and imaging the time varying invisible light can comprise filtering, so as to define a plurality of sub-pixels for the visible light and so as to define a plurality of sub-pixels for the invisible light.

According to one aspect, the present invention comprises a method for forming a three dimensional image of a scene, wherein the method comprises illuminating the scene with time varying invisible light, forming a two dimensional image of the scene from visible light, and determining depth information about the scene from variations in the reflected invisible light.

According to one aspect, the present invention comprises a method for forming a three dimensional model, wherein the method comprises transmitting light having a time varying parameter to an object, receiving the light having the time varying parameter that is reflected from the object, determining values for the time varying parameter, using the values to determining depth information of the object, forming a two dimensional image of the object, and combining the depth information with the two dimensional image.

According to one aspect, the present invention comprises an imaging sensor configured to use detection of interfering coherent beams to determine depth information of a scene.

According to one aspect, the present invention comprises an imaging sensor configured to use a beat frequency of a reference beam and an emitted beam to determine depth information of a scene.

According to one aspect, the present invention comprises an imaging sensor comprising an array of light sensitive elements and a filter configured to transmit visible light to the array for two dimensional imaging and configured to transmit invisible light to the array for depth imaging.

According to one aspect, the present invention comprises a camera comprising a source of invisible light that changes in frequency during imaging, an imaging sensor, and a filter configured to selectively transmit visible light to selected pixels of the imaging sensor and configured to transmit invisible light to other pixels of the imaging sensor.

The camera, according to one aspect, further comprises a combiner that is configured to combine infrared light reflected from a scene with infrared light more directly from the source, i.e., a reference beam. The reference beam was not reflected from the scene. The combiner provides the combined light to the imaging sensor.

The camera can comprise a frequency counter configured to count a beat frequency of infrared light reflected from a scene after combination with infrared light from the source that was not reflected from the scene.

The imaging sensor can comprise at least one frequency counter that is configured to count a beat frequency from selected pixels, e.g. infrared detecting pixels, thereof. Each infrared detecting pixel can comprise a dedicated frequency counter that is built into the imaging sensor.

According to one aspect, the present invention comprises a machine vision system. The machine vision system comprises a camera comprising a source of invisible light that changes in frequency during imaging, an imaging sensor, a filter configured to selectively transmit visible light to selected pixels of the imager and configured to transmit invisible light to other pixels of the imaging sensor, and at least one device responsive to the camera.

According to one aspect, the present invention comprises a data structure comprising data representative of a two dimensional image of a scene and data representative of depth information of the scene, wherein the depth information was obtained by imaging a combination of time varying invisible light and reference light.

The manner in which the infrared illumination beam varies may be different from a continuously increasing linear sweep. Rather than continuously increasing, the beam may change frequency in discrete increments. It may alternatively be a decreasing sweep. Rather than a linear sweep, an exponential or other type of sweep may be used.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A filter, comprising:
    a plurality of pixelated visible light filter elements, each of which transmits a band of visible light;
    a plurality of pixelated invisible light filter elements, each of which transmits a band of invisible light; and,
    a plurality of frequency counters, each respectively associated with a respective one of the invisible light filter elements and operable to measure the frequency of intensity modulations of the invisible light respectively transmitted therethrough.

2. The filter as recited in claim 1, wherein the visible light is red, green, and blue light and the invisible light is infrared light.

3. The filter as recited in claim 1, wherein the visible light is cyan, yellow, and magenta light and the invisible light is infrared light.

4. The filter as recited in claim 1, wherein three visible light filter elements and one invisible light filter element define a pixel.

5. An imaging sensor, comprising:
    an array of light sensitive elements;
    a filter configured to transmit visible light to the array for two dimensional imaging and configured to transmit invisible light to the array for depth imaging; and,
    an array of frequency counters, each respectively associated with a selected one of the invisible light sensitive elements and operable to measure the frequency of intensity modulations of the light respectively transmitted thereto.

6. The imager as recited in claim 5, wherein the light sensitive elements comprise CMOS devices.

7. The imager as recited in claim 5, wherein the filter comprises an IRGB filter.

8. A camera, comprising:
    a source of invisible light associated with the camera that changes in frequency during imaging and is arranged to illuminate a scene being imaged by the camera;
    an imaging sensor; and,
    a filter configured to selectively transmit visible light to selected pixels of the imaging sensor and configured to transmit invisible light supplied directly thereto from the source combined with invisible light reflected back from the scene to other pixels of the imaging sensor a plurality of frequency counters, each respectively associated with a respective one of the invisible light filter elements and operable to measure the frequency of intensity modulations of the invisible light respectively transmitted there through.

9. The camera as recited in claim 8, wherein the imaging sensor comprises a CMOS imaging sensor.

10. The camera as recited in claim 8, wherein the filter comprises an IRGB filter.

11. The camera as recited in claim 8, wherein the source of invisible light comprises a tunable infrared laser.

12. The camera as recited in claim 8, further comprising a combiner configured to combine the infrared light reflected from the scene with the infrared light supplied directly thereto from the source and to provide the combined light to the imaging sensor.

13. The camera as recited in claim 8, further comprising a frequency counter configured to count a beat frequency of the infrared light reflected from a scene after combination with the infrared light supplied directly thereto from the source.

14. The camera as recited in claim 8, wherein the imaging sensor comprises at least one frequency counter configured to count a beat frequency from selected pixels thereof.

15. The camera as recited in claim 8, wherein the imaging sensor comprises a dedicated frequency counter configured to count a beat frequency from infrared detecting pixels thereof.

16. A machine vision system, comprising:
    a camera, comprising:
        a source of invisible light associated with the camera that changes in frequency during imaging and arranged to illuminate an object being imaged by the camera;
        an imager;
        a filter configured to selectively transmit visible light to selected pixels of the imager and configured to transmit invisible light supplied directly thereto from the source combined with invisible light reflected back from the object to other pixels of the imager; and,
        at least one device responsive to the imager a plurality of frequency counters, each respectively associated with a respective one of the invisible light filter elements and operable to measure the frequency of intensity modulations of the invisible light respectively transmitted there through.

17. A method of filtering light, the method comprising:
    filtering a portion of a light beam through visible light filter elements of a filter;
    filtering a portion of the same light beam through invisible light filter elements of the same filter; and,
    counting a beat frequency of the light respectively filtered by the invisible light filter elements with respective frequency counters.

* * * * *